United States Patent Office 3,182,499
Patented May 11, 1965

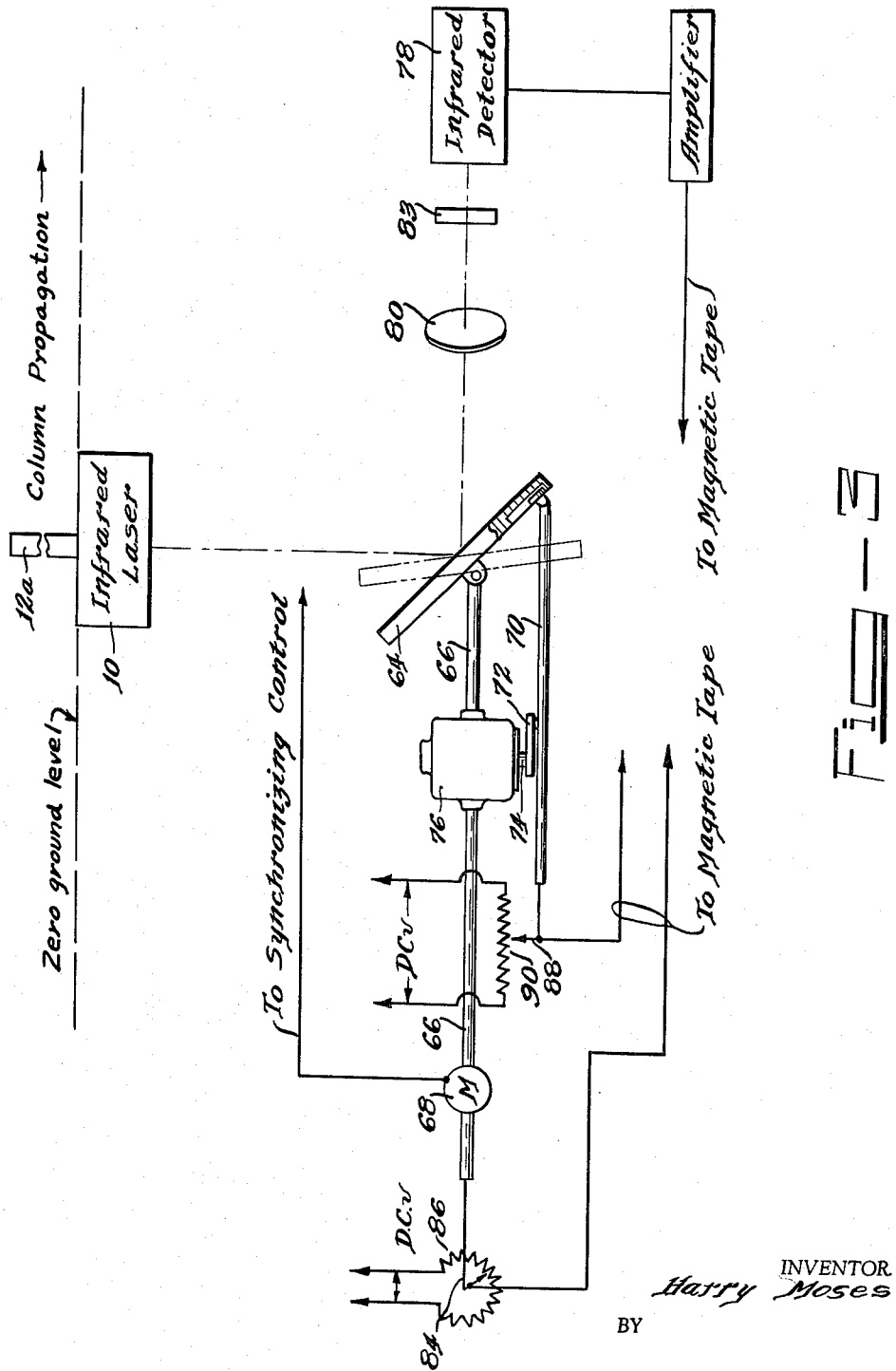

3,182,499
METHOD OF MEASURING WIND VELOCITY
Harry Moses, Park Forest, Ill., assignor to the United States of America as represented by the United States Atomic Energy Commission
Filed Dec. 28, 1962, Ser. No. 248,168
13 Claims. (Cl. 73—189)

This invention relates to methods of measuring wind velocity profiles and more specifically to methods of measuring such profiles using only ground based equipment.

There are three principal methods presently used in measuring wind velocity profiles. The first, utilizes a balloon which when released rises at a fairly uniform rate. Ground based equipment measures at sequential time intervals the azimuthal and elevational angles of the balloon. Thus, the spatial displacement of the balloon from a ground reference point at predetermined time intervals may be calculated, wherefrom a wind velocity profile may be determined. One of the main faults with this method is that the wind profile obtained isn't vertical, but is a sloping profile corresponding to the path of travel of the balloon in its slow ascent. Further, since the measurements are made optically, the method cannot be used whenever low cloud conditions exist. This difficulty may be overcome by using a corner reflector attached to the balloon and using radar to make the measurements, however, this is expensive. The resolution of this method is limited.

The second method uses wind velocity sensing equipment which is mounted at predetermined height intervals on a high tower. The main objection to this method is the physical limitation on the height of the tower and the cost thereof.

The third method uses a rocket which is fired vertically and leaves a smoke trail along its path of travel. Using ground based equipment, as in the balloon method, azimuthal and elevational angles are measured so that the spatial displacement of the smoke trail at predetermined time intervals, and hence wind velocity, may be calculated. Like the balloon, this method, being optical, is subject to non-operability during low cloud conditions. Rockets are expensive and since their point of descent cannot be determined accurately, they cannot be used in populated areas. Further, neither the rocket nor the balloon methods permit rapid repeated spatial displacement measurements, and hence wind velocity measurements, to be made at given spatial coordinates.

It is therefore one object of the present invention to provide a method of measuring wind velocity using only ground based equipment.

It is another object of the present invention to provide a method of obtaining a wind velocity profile of horizontal winds using only ground based equipment.

It is another object of the present invention to provide a method of obtaining a wind velocity profile in the presence of low cloud conditions and in a populated area using only ground based equipment.

It is another object of the present invention to provide a method of obtaining repeated wind velocity measurements between given spatial coordinates.

It is still another object of the present invention to provide a method of rapidly obtaining repeated horizontal wind velocity measurements along a coordinate axis essentially vertical with a high degree of resolution using only ground based equipment.

Other objects of the present invention will become more apparent as the detailed description proceeds.

In general, the present invention comprises intermittently transmitting infrared radiation at a predetermined frequency into the atmosphere whereby the radiation heats a portion thereof. Ground based infrared detectors are used to scan the heated portion of the atmosphere at determined time intervals and determine the spatial coordinates thereof. From the spatial coordinates and the time intervals, the velocity of the heated portion of the atmosphere and hence the wind velocity is computed.

More complete understanding of the invention will best be obtained from consideration of the accompanying drawings in which:

FIG. 3 is a schematic diagram illustrating the other preferred infrared scanning detector system for the practice of the present invention.

Figure 1:
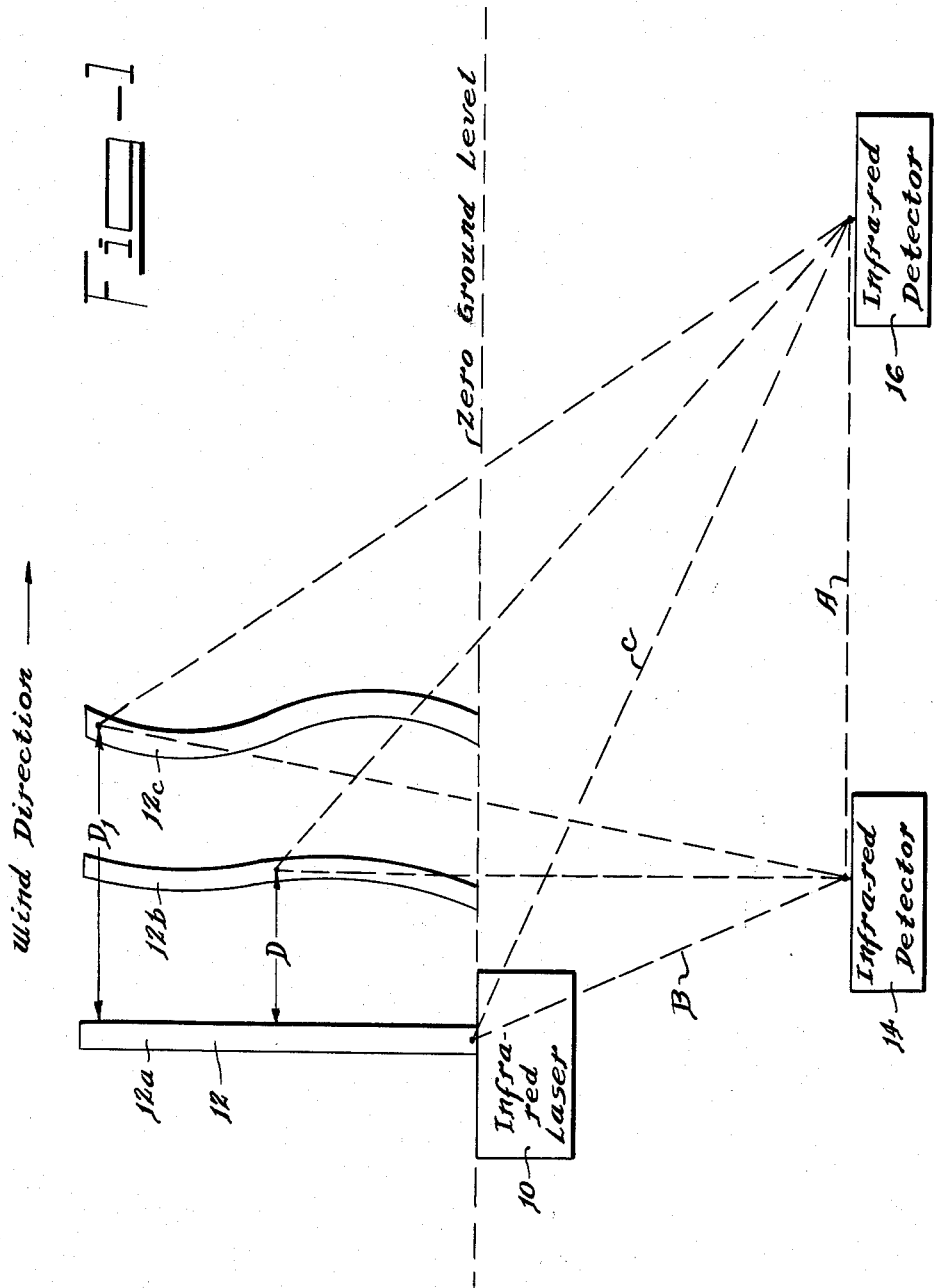
FIG. 1 is a schematic diagram illustrating the propagation of a heated column of air and the location and scanning of infrared detector systems.

Reference is made to FIGURE 1 to illustrate the basic operation of the present invention. The method uses an infrared laser 10 which is capable of generating a pulsed nondivergent infrared beam 12. The laser 10 is mounted at ground level so that the infrared beam 12 is transmitted vertically into the atmosphere. The atmosphere contains carbon dioxide and water vapor which will absorb infrared radiation at particular frequencies. The wave length or frequency of transmission of the laser 10 is therefore chosen to optimize absorption of the beam 12 by one of these gases, such as 4.1 microns in the 4.3 micron absorption band for $CO_2$. Absorption of the radiation by one of these gases is accompanied by heating, so that the beam 12 becomes in effect a heated column of air 12a. The heated column of air will move according to prevailing wind velocities as shown by columns 12b and 12c, representing column 12a at finite times after generation.

Two ground based infrared detector systems 14 and 16 are mounted a known distance A part and known distances B and C from the laser 10. The detector systems 14 and 16 are positioned such that their base line A is essentially parallel to the direction of the wind. Thus, the spatial coordinates of the origin of the heated column 12a are known. The detector systems 14 and 16 are capable of scanning both in azimuth and in elevation. A more detailed explanation of their method of scan will be given at a later time. It is sufficient for the present description that the two detector systems 14 and 16 scan the heated column of air 12a as it moves subject to prevailing wind velocities giving both azimuthal and elevational angular information therefor at discrete heights thereof. From the azimuthal and elevational angular data for discrete heights of the column 12a, the spatial coordinates thereof may be computed since the spacing between the two detector systems 14 and 16 is known. Using a "zero" reference time base and knowing the original reference spatial coordinates of the column 12a, the incremental distance changes D, $D_1$, etc. of discrete heights of the column 12a may be computed as well as the time required therefor. Thus, knowing the distances D, $D_1$ travelled by the discrete heights of the column 12a and the time required therefor, the wind velocity at the discrete heights of the column 12a may be computed therefrom using the formula: distance equals velocity times time. Thus a wind velocity profile is obtained for the height of the heated column of air 12a.

Figure 2:
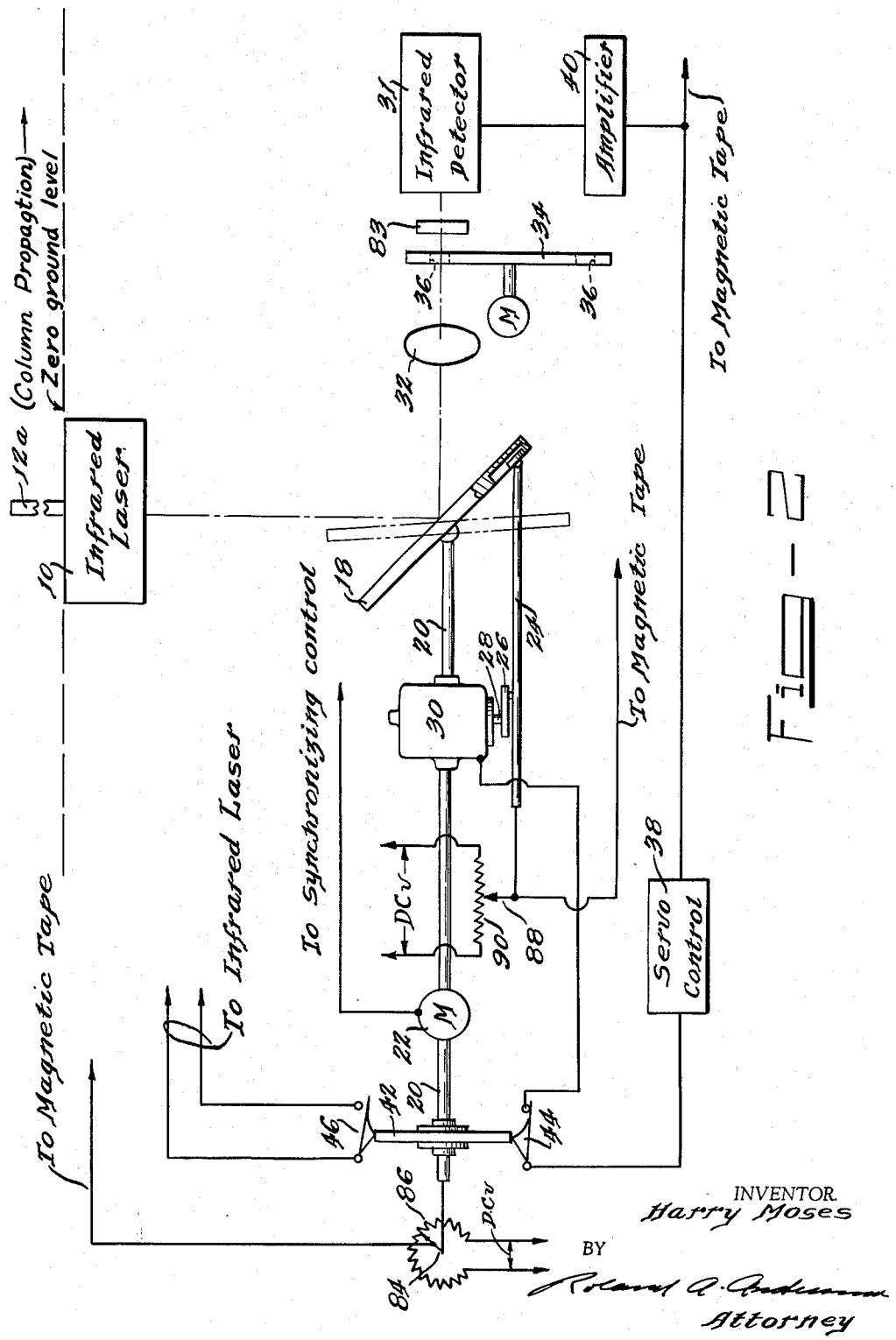
FIG. 2 is a schematic diagram illustrating one preferred infrared scanning detector system for the practice of the present invention.

Turning now to FIGURES 2 and 3 a more detailed description will be given for the preferred scanning operation of the infrared detector systems 14 and 16 of FIGURE 1. One of the detector systems 14 and 16 tracks the heated column of air 12a in azimuth while scanning in elevation and the other detector system scans both in elevation and azimuth. For the purposes of the present description, detector system 14, as shown in FIGURE 2, tracks the column 12a in azimuth while scanning in elevation and detector system 16, as shown in FIG- URE 3, scans the column 12a in azimuth and elevation.

In FIGURE 2, a plane mirror 18 is mounted on an extensible shaft 20 of a synchronous motor 22 and adapted to rotate therewith whereby scanning is obtained in the vertical plane. A shaft 24 has one end thereof slideably engaged with the outer periphery of the mirror 18. The other end of the shaft 24 is attached to a cam 26 which in turn is mounted on an extensible shaft 28 of a motor 30. The motor 30 is mounted on the extensible shaft 20 and rotates therewith. The shaft 28 of motor 30 is perpendicular to the longitudinal axis of shaft 20. The cam 26, as it rotates with shaft 28, imparts a reciprocating linear motion to shaft 24 which in turn causes mirror 18 to have esesntially azimuthal motion for the length of travel of heated column of air 12a.

An infrared detector 31, such as a liquid-nitrogen-cooled gold-doped germanium cell, is suitably mounted close to the mirror 18. A lens 32, transparent to infrared radiation, such as an arsenic trisulphide lens, is disposed between mirror 18 and the infrared detector 31. The mirror 18 is arranged so that as it moves in elevation and azimuth the received infrared radiation is focused via the lens 32 on the infrared detector 31.

A motor driven disk 34, painted black on both sides and having apertures 36 therethrough around the circumference thereof, is disposed between the lens 32 and the infrared detector 31. The disk 34 is positioned so that as it rotates, the apertures 36 therein are successively aligned to permit transmission therethrough of the received radiation from the mirror 18 to the infrared detector 31. Thus, the infrared detector 31 alternately sees the reflected infrared radiation from the mirror 18 and the black surface of the disk 34 whereby the input into the radiation detector 31 is a series of pulses which are easier to handle as data than a continuous signal.

As previously recited the infrared detector system 14 of FIGURE 1 is used to track the heated column of air 12a in azimuth while scanning it in elevation. Tracking thereof is accomplished in the following manner.

A servo control 38 samples the output of the amplifier 40 and controls the rate of speed of the motor 30 in accordance therewith. If the mirror 18 loses track in azimuth of the heated column of air 12a then there is no output signal from amplifier 40. In the absence of a signal from the amplifier 40, the servo control drives the motor 30 at a high rate of speed (at least 10 r.p.s.) until the mirror 18 again detects the presence of the heated column of air 12a. It is to be noted that the azimuthal tracking of column 12a by the detector system 14 does not lie in a true azimuthal plane since the angular elevational scan changes with rotation of shaft 20. The tracking is essentially azimuthal with the relationship between the actual azimuthal tracking angle ($\theta$) and the true azimuthal tracking angle ($\alpha$) being described by the equation:

$$\tan \alpha = \tan \theta \cos \psi$$

where angle $\psi$ is the elevational angle determined by the rotative position of shaft 20.

As previously described, the laser 10 is capable of pulsed operation. In order to eliminate confusion in the tracking of subsequent heated air columns 12a, the generation thereof is governed by the vertical scanning action of the mirror 18. A cam 42 is mounted on the extensible shaft 20 of synchronous motor 22 so as to rotate therewith. The cam 42 is engageable with a normally closed microswitch 44 and is cut so that when the shaft 20 is at a first predetermined position of angular rotation, with the mirror 18 at its maximum elevational scan, the cam 42 engages microswitch 44 to open the contacts thereof. The contacts of microswitch 44 are held open by cam 42 until the shaft 20 rotates to a second predetermined angular position, where the mirror 18 is at its minimum angle of scan and ready to start a new vertical scan. The open contacts of the microswitch 44 disconnect the motor 30 from its driving source, the servo control 38. Thus, the azimuthal track of mirror 18 is stopped during the return sweep of the elevational scan thereof. The cam 42 is also engageable with a second microswitch 46 whose normally open contacts are connected to laser 10. When the shaft 20 is at its second predetermined angular position, with the mirror 18 at its minimum elevational scan, the cam 42 momentarily closes the normally open contacts of the microswitch 46 whereby laser 10 is gated to transmit a pulse of infrared radiation. Almost simultaneously cam 42 closes microswitch 44 to resume tracking in the azimuth direction.

Thus, the mirror 18 tracks the heated column of air 12a essentially in azimuth while it makes a single vertical scan along the height thereof. When the mirror 18 reaches its maximum point of elevational scan, the azimuthal tracking ceases while the mirror 18 returns to its minimum point of elevational scan. At this point a new heated column of air 12a is generated by the laser 10 and mirror 18 starts its tracking cycle over again on the new column 12a. Thus, the infrared detector system of FIGURE 2 tracks each heated column of air 12a essentially in azimuth while scanning it once in elevation.

It should be noted that since motor 30 and shaft 28 rotate with shaft 20, the associated appurtenances to shaft 28 will also rotate with shaft 20. Consequently, shaft 28 is appropriately counterbalanced to facilitate rotation. Further, though the electrical connections to the associated appurtenances of shaft 28 and to motor 30 are shown as being directly connected thereto, it is obvious, and should be understood, that such connections should be made through a suitable electrical connecting device such as slip rings whereby rotative movement is permitted.

When a new heated column of air 12a is generated, the servo control 38 drives motor 30 which in turn drives the mirror 18 from its position of rest, where tracking of the old column 12a ceased, until the mirror 18 detects the presence of and commences tracking the new heated column of air. Since, at this time, the old column 12a is still within detection range of the infrared detector 31, there is a danger that the detector 31 would commence to track the old column 12a instead of the new heated column of air 12a. This danger is eliminated by making the cam 26 to provide adjustable linear motion for shaft 24. This may easily be accomplished by curved slots cut into the cam 26, the shaft 24 being attached to cam 26 by nut and bolt connections therethrough. The lineal travel of shaft 24 is adjusted so that the azimuthal traverse by mirror 18 is limited to a sector scan equal to the distance travelled by the column 12a during the time required to make one vertical elevational scan thereof. Thus, when the new column of heated air is generated, the mirror 18 cannot "see" the old column 12a and hence tracking may be accomplished only on the new column.

Obviously various combinations of speeds of rotation for motors 22 and 30 and disk 34 are possible. The following are considered to give acceptable results with the infrared detector system 14 spaced 20 meters from laser 10 and 20 meters from detector system 16 and infrared detector system 16 spaced 28.2 meters from laser 10. The disk 34 is rotated at a speed such that the infrared detector 31 sees the mirror 18 through apertures 36 twenty-four hundred times per second. The synchronous motor 22 has a speed of 1 r.p.s. with the shaft 20 being geared down therefrom to ¼ r.p.s. Thus, mirror 18 makes a vertical elevational scan in approximately 1 second (assuming 80° of rotation by shaft 20 for vertical scanning) with the return time from maximum to minimum (280° of rotation by shaft 20) being approximately 3 seconds. The azimuth track motor 30 rotates at a speed necessary to track the column 12a, however, when track is lost, a speed of 10 r.p.s. is satisfactory to bring it back to a tracking position.

Reference is now made to FIGURE 3 wherein is shown a schematic of the infrared detector system 16 of FIGURE 1. As previously described, the detector system 16 does not track, but scans both in azimuth and elevation.

A plane mirror 64 is mounted on an extensible shaft 66 of a motor 68 and adapted to rotate therewith whereby scanning is obtained in the vertical plane. A shaft 70 has one end thereof slidably engaged with the outer periphery of the mirror 64. The other end of shaft 70 is attached to a cam 72 which in turn is mounted on an extensible shaft 74 of a motor 76. The motor 76 is mounted on the extensible shaft 66 and rotates therewith. The shaft 74 of motor 76 is perpendicular to the longitudinal axis of shaft 66. The cam 72 as it rotates with shaft 74 imparts an essentially linear motion to shaft 70 whereby the mirror 64 is moved in an essentially azimuthal plane to provide azimuthal scanning motion for the length of travel of the heated column of air 12a.

An infrared detector 78 similar to that shown in FIGURE 2 is suitably mounted close to the mirror 64. A lens 80, also similar to that shown in FIGURE 2, is disposed between mirror 64 and the infrared detector 78. The mirror 64 is arranged so that as it scans in azimuth and elevation the received infrared radiation is focused via lens 80 on the infrared detector 78. The cam 72 is constructed similar to cam 26 in FIGURE 2 and provides an adjustable azimuthal sector scan for the mirror 64 equal to the distance travelled by heated column of air 12a during the time required to make one vertical elevational scan thereof.

To improve the accuracy of the present method filters 83 are inserted in front of the infrared detectors 31 and 78. These filters 83 stop all radiation of wave length less than 1.6 microns, thus eliminating solar radiation.

The speeds of rotation of synchronous motor 68 and shaft 66 are identical to that of the motor 22 and shaft 20 of FIGURE 2 so that the mirrors 64 and 18 of FIGURES 3 and 2, have the same rate of elevational scan. The shaft 66 of detector system 16 and shaft 20 of detector system 14 are aligned so that they are collinear. Further, motors 22 and 68 of detector systems 14 and 16 are synchronized by a standard synchronizing control (not shown) so that the shafts 28 and 74 rotate therearound in a plane defined by the shafts 28 and 74 and the longitudinal axis of shafts 20 and 66, and mirrors 18 and 64 are synchronized in their elevational scanning. With the shafts 20 and 66 so aligned and elevational scanning so synchronized, the scanning by detector system 16 will be performed in the same plane as tracking is accomplished by detector system 14. It is to be noted that, as with detector system 14, the relationship between the actual azimuthal scanning angle ($\theta'$) and the true azimuthal scanning angle ($\alpha'$) is described by the equation:

$$\tan \alpha' = \tan \theta' \cos \psi$$

where angle $\psi$ is the elevational angle determined by the rotative position of shaft 66. The rotational speed of motor 76 in FIGURE 3, and hence the azimuthal scanning rate of mirror 64, is independent of the corresponding motor 30 in FIGURE 2 since motor 30 of FIGURE 2 performs a tracking function. A suitable speed for motor 76 is 10 r.p.s.

As in FIGURE 2, electrical connections to the motor 76 and to the associated appurtenances of shaft 74 are made through a suitable electrical connecting device such as slip rings.

It is to be understood that FIGURES 2 and 3 are drawn to illustrate in schematic form the infrared systems 14 and 16 of FIGURE 1 and that systems 14 and 16 may be interchanged with each other in their positions shown in FIGURE 1. Accordingly, both FIGURES 2 and 3 have been drawn with the apparatus thereof shown tracking and scanning in the same direction, to wit, with the heated air column 12a going away from the mirrors 18 and 64.

For further understanding of the present invention, the tracking and scanning functions of the infrared detector systems 14 and 16 will now be described in view of the embodiments shown thereof in FIGURES 2 and 3.

Assuming that the mirrors 18 and 64 of FIGURES 2 and 3 are at their minimum point of elevational scan, laser 10 generates a pulsed nondivergent infrared beam 12 into the atmosphere. Using a 100 $\mu$second pulsed beam having 500 joules of energy, the beam 12 will generate a heated column of air 12a approximately 300' high and approximately 0.5 inch wide. The linear motion of shafts 24 and 70 is set so that the mirrors 18 and 64 are permitted an azimuthal sector view of the column 12a from its point of origin to a point equal to the distance travelled by the column 12a in 1 second. This setting need only be approximate and may readily be determined by approximating the wind velocity. Thus, the infrared detector system 14 tracks the column 12a in azimuth through the sector permitted by cam 26 while making one vertical scan thereof in the elevational plane. At the motor speeds previously recited, the duration of the azimuthal tracking and vertical elevational scan by detector system 14 is 1 second. During this period the infrared detector system 16 scans the heated column of air 12a in azimuth and elevation. Since the shafts 20 and 66 of detector systems 14 and 16 are collinear and synchronized in rotation to provide for synchronized elevational scanning by mirrors 18 and 64, the scanning by mirror 64 will be in the same plane as the tracking plane of mirror 18. Further, since the elevational scan of detector system 16 is synchronized with that of detector system 14, it will also make one vertical scan in the elevational plane during the 1 second period. However, in the azimuthal scanning plane, the infrared detector system 16 is rotating at 10 r.p.s., therefore, it will see the heated column of air 12a twenty times during the one elevational scan.

At the termination of the 1 second period when the elevational scans of both detector systems 14 and 16 are at their maximum elevational scanning angle, the azimuthal tracking of infrared detector system 14 is stopped. The elevational scananing device of system 14 then returns to its "zero" position, taking approximately 3 seconds. At this point the laser 10 generates another pulsed infrared beam 12 and the servo control 38 of system 14 is re-energized causing the mirror 18 to rotate in azimuth at 10 r.p.s. until the new column 12a is detected and tracking thereof commences. The preset sector scan prevents the infrared detector system 14 from seeing the old column 12a during the azimuthal rotation prior to tracking of the new column 12a. Since the elevational scan of detector system 16 is synchronized with that of detector system 14 it will return from its maximum elevational angle of scan to its "zero" position at the same time. However, during this 3 second time interval, azimuthal scanning by detector system 16 continues but because of its preset sector scan, it will not see the old heated column of air 12a until a new column 12a is generated.

Referring again to FIGURES 2 and 3, a description will now be given of the extraction of the azimuthal and elevational angular data from which wind velocities and hence a wind profile may be calculated. All data is fed to a 7 channel magnetic tape recorder. The apparatus used for extracting data from detector systems 14 and 16 is identical, therefore, for simplicity of explanation, the description will be limited to that of detector system 14 of FIGURE 2, like identifying symbols being used for the same components in detector system 16 of FIGURE 3.

The wiper arm 84 of a linear potentiometer 86 is mounted on and adapted to rotate with the extensible shaft 20 of synchronous motor 22. A D.-C. voltage is applied across the potentiometer 86 and the output voltage taken from the wiper arm 84 thereof is fed to one channel of a magnetic tape recorder. The wiper arm 88 of a linear potentiometer 90 is mounted on and adapted to move with the extensible shaft 28 of motor 30. A D.-C. voltage is applied across the potentiometer 90 and the output voltage taken from the wiper arm 88 thereof is fed to a channel of the magnetic tape recorder. The output from the infrared detector 31 is also fed to a channel of the magnetic tape recorder. The wiper arm 84 of potentiometer 86 is calibrated for a "zero" reference point when the detector system 14 is at an elevational angle viewing the base of the heated column of air 12a, this is also the minimum angle of elevational scan for the detector system 14. The wiper arm 88 of potentiometer 90 is calibrated for a "zero" reference setting when the detector system 14 is at an essentially azimuthal angle viewing the point of generation of the heated column of air 12a.

An oscillator (not shown) generates a time reference signal which is transmitted to a channel of the tape recorder wherefrom elapsed time may be measured. Whenever infrared laser 10 transmits a pulse of infrared radiation it also transmits a marker pulse which is superimposed on the time reference channel of the magnetic tape recorder. The marker pulse gives a "zero" reference time base. Prior to the measurement of the wind velocity profile the fixed parameters of the system, distances A, B and C between the laser 10 and infrared detectors 14 and 16, are fed into the magnetic tape recorder. Thus, at the termination of scanning and tracking of one or more columns 12a, all the information necessary for the computation of the wind velocity profile is stored on the magnetic tape. This information may then be read out and the wind velocity profile calculated by hand or the information may be fed into a computer which then determines the wind velocity profile.

It is to be understood that other methods may be used to scan the heated column of air 12a and the present invention is not to be limited to the above described preferred method.

For example with minor modification of the embodiments shown in FIGURES 2 and 3 the following method may be used. Laser 10 independently generates a pulsed infrared beam 12 at predetermined time intervals, for the purposes of illustration two seconds will be used. Infrared detector systems 14 and 16 are aligned and synchronized in elevational movement as before, however, instead of continuous scanning in elevation the synchronizing control imparts a step function elevational scan coordinated with the generation of infrared beams 12 by laser 10. Thus, infrared detector systems 14 and 16 remain at a fixed angle of elevation for a particular heated column of air 12a, when a new column of air is generated the detector systems 14 and 16 increase their angle of elevation a finite amount. Using a 2 second interval of generation of heated columns of air 12a, infrared detector systems 14 and 16 will increase their angle of elevation a finite amount every 2 seconds in conjunction therewith.

During the 2 second period while the elevational angles of infrared detector systems 14 and 16 are held constant, infrared detector system 14 tracks while infrared detector 16 scans the column 12a as previously described. Predetermined sector scan, as previously described, should still be used in this method to limit the azimuthal track and scan of the infrared detector systems 14 and 16 to the distance travelled by a heated column of air 12a from its point of generation to a terminus 2 second later when a new column 12a is generated. Thus, in this method, for each heated column of air 12a generated by laser 10, azimuthal tracking and scanning is effected at only one particular height thereof, the wind velocity being determined only for that particular height. The total wind velocities measured then give the desired wind velocity profile for a height equal to the length of the generated columns 12a.

The present invention should not be limited to the use of only one laser infrared generator. The attenuation of infrared radiation in the atmosphere is in accordance with Beer's law and is exponential in character. Thus, since the radiation decreases exponentially from the source, the heating effect therefrom will also decrease exponentially from the source thereby providing a limitation on the detectable altitude obtainable with a single laser. Increased altitude measurements may be obtained by using a plurality of infrared laser sources which have their beams intersect in the atmosphere, the point of intersection providing a heated portion of air which may be scanned to obtain a wind velocity profile therefrom.

For example, using two lasers, one of the lasers is positioned to generate a pulsed vertical infrared beam and the other laser is positioned to generate a second pulsed infrared beam which intersects the vertical beam. With the two lasers being pulsed simultaneously, the elevational angle of the second beam may be varied in step functions to provide successive heated portions of air in a vertical column. The method of tracking and scanning the heated portions of the air to determine the wind velocity at that point is similar to that previously described using step function elevational scanning. The only modification being necessary, is that the elevational step functions of the infrared detector systems have to be synchronized with that of the laser generating the angular infrared beam, whereby the infrared detector systems are at the correct elevational angle to view successive heated portions of the air as they are generated. More than two lasers may be used provided that simultaneity is maintained in infrared pulse generation and that the angular beams are synchronized with respect to each other in elevation to provide a continuous common intersection point along the vertical beam. As before, the elevational angles of the infrared detectors also have to be synchronized with the elevational angle of the lasers so that they see the successive heated portions of the air.

Although the above described methods have been solely directed to wind velocity measurements, it is to be understood that they are also applicable to measurement of fluid velocity. For example, in measuring the velocity of ocean currents at various depths of the ocean, the infrared radiation beam from a laser is transmitted into the ocean to heat a portion thereof. The movement of this heated portion with respect to time is measured with infrared detector systems similar to those described supra and in the same manner.

Persons skilled in the art will, of course, adapt the teachings of the present invention to methods far different than those illustrated. Accordingly, the scope of protection afforded the invention should not be limited to the methods shown in the drawings and described above but should be determined only in accordance with the appended claims.

What is claimed is:

1. A method of measuring wind velocity comprising the steps of generating infrared radiation, transmitting said infrared radiation into the atmosphere to heat a portion thereof, monitoring said heated portion of the atmosphere at measured time intervals to determine the spatial coordinates thereof, and computing from said spatial coordinates and time intervals the velocity of said heated portion of the atmosphere and hence the wind velocity.

2. The method according to claim 1 wherein said infrared radiation is generated at a frequency to optimize the absorption thereof by gases contained in the atmosphere.

3. The method according to claim 1 wherein monitoring of said heated portion of the atmosphere comprises the steps of mounting first and second infrared radiation detector systems at predetermined distances from each other and the point of transmission of said infrared radiation into the atmosphere, setting said infrared radiation detector systems in elevation to view said heated portion of the atmosphere, tracking said heated portion of the atmosphere in azimuth at said elevational setting with one of said infrared detector systems, scanning in azimuth at said elevational setting with the other infrared detector system, measuring the azimuthal angles of said infrared detector systems for coincident detection of said heated portion of the atmosphere and the time intervals therebetween, and computing from said azimuth and elevational angles and said predetermined distances the spatial coordinates of said heated portion of the atmosphere at said measured time intervals.

4. A method of measuring wind velocity comprising the steps of generating infrared radiation at a predetermined frequency, transmitting said infrared radiation as a nondivergent infrared beam into the atmosphere whereby a heated column of air is generated therein, monitoring said heated column of air at a particular height thereof to determine the spatial coordinates of said column of air at said particular height at measured time intervals, and computing from said spatial coordinates and time intervals the velocity of said column of air at said particular height which is a measure of the wind velocity at said particular height.

5. The method of claim 4 wherein monitoring said column of air comprises the steps of mounting first and second infrared radiation detector systems at predetermined distances from each other and the point of generation of said heated column of air, setting said first and second infrared detector systems in elevation to view said heated column of air at a particular height thereof, tracking said heated column of air at said particular height in azimuth with one of said infrared detector systems, scanning in azimuth at said particular height with the other infrared detector system, measuring the azimuth angles of said infrared detector systems for coincident detection of said heated column of air and the time intervals therebetween, and computing from said azimuth and elevational angles and said predetermined distances the spatial coordinates of said heated column of air at said particular height at said measured time intervals.

6. A method of measuring a wind velocity profile comprising the steps of generating infrared radiation, transmitting said infrared radiation into the atmosphere to heat a portion thereof at a particular height, monitoring said heated portion of the atmosphere at measured time intervals to determine the spatial coordinates thereof, computing from said spatial coordinates and time intervals the velocity of said heated portion of the atmosphere and hence the wind velocity thereof, and repeating the prior described steps with subsequent portions of the atmosphere being heated at different particular heights whereby a wind velocity profile is obtained.

7. The method according to claim 6 wherein said infrared radiation is generated at a frequency to optimize the absorption thereof by gases contained in the atmosphere.

8. The method according to claim 7 wherein said generating and transmitting of infrared radiation comprises the steps of placing a plurality of infrared lasers a predetermined distance apart from each other, simultaneously exciting said infrared lasers to generate a pulsed nondivergent beam of infrared radiation from each of said lasers, angularly transmitting said beams of infrared radiation to provide a common intersecting point therefor, said point of intersection defining said heated portion of the atmosphere to be monitored, and changing the angle of transmission of said infrared beams to provide common points of intersection at different particular heights for subsequent pulsed beams transmitted by said infrared lasers.

9. The method according to claim 8 wherein said infrared radiation is transmitted so that each of said portions of the atmosphere are heated along a vertical line whereby the resulting wind profile is measured essentially along the vertical.

10. The method according to claim 9 wherein the transmission of infrared radiation to give heated portions of the atmosphere along a vertical line comprises the steps of transmitting the pulsed beam of one of said infrared lasers vertically, angularly transmitting the pulsed beams of the other infrared lasers to intersect the vertically transmitted pulsed infrared beam at a common intersection point, and changing the angle of transmission of the pulsed infrared beams of the other lasers to provide common points of intersection along the vertically transmitted pulsed infrared beam at particular heights thereof whereby subsequent portions of the atmosphere are heated in a vertical line.

11. The method according to claim 10 wherein monitoring of the heated portions of the atmosphere comprises the steps of mounting first and second infrared radiation detector systems at predetermined distances from each other and the infrared laser generating the vertical pulsed beam, synchronizing the elevational setting of said detector systems with the angular transmitted pulsed infrared beams so that said detector systems view each of said heated portions of the atmosphere at the particular heights that said portions are generated, tracking each of said heated portions of the atmosphere in azimuth with one of said detector systems at said synchronized elevational setting therefor, scanning each of said heated portions of the atmosphere in azimuth with the other detector system at said synchronized elevational setting therefor, measuring the azimuth angles of said infrared detectors for coincident detection of each of said heated portions of the atmosphere and the time intervals therebetween, and computing from said azimuth and elevational angles and said predetermined distances the spatial coordinates of each of said heated portions of the atmosphere at said measured time intervals associated therewith.

12. A method of measuring a wind velocity profile comprising the steps of generating infrared radiation at a predetermined frequency, transmitting said infrared radiation as a non divergent infrared beam into the atmosphere whereby a heated column of air is generated therein, monitoring said heated column of air to determine the spatial coordinates of said column of air along the height thereof at measured time intervals, and computing from said spatial coordinates and time intervals the velocity of said column of air along the height thereof which is a measure of the wind velocity profile along the height of said column of air.

13. The method according to claim 12 wherein monitoring said column of air comprises the steps of mounting first and second infrared radiation detector systems at predetermined distances from each other and the point of generation of said heated column of air, synchronizing said detector systems to scan in elevation along the height of said column of air, tracking said heated column of air in azimuth with one of said infrared detector systems while scanning in elevation therewith, scanning in azimuth with the other infrared detector system while scanning in elevation therewith, measuring the azimuthal and elevational angles of said detector systems for coincident detection of said heated column of air and the time intervals therebetween, and computing from said azimuthal and elevational angles and said predetermined distances the spatial coordinates of said heated column of air along the height thereof at said measured time intervals.

No references cited.

RICHARD C. QUEISSER, *Primary Examiner.*